(12) United States Patent
Shimizu et al.

(10) Patent No.: US 12,025,012 B2
(45) Date of Patent: Jul. 2, 2024

(54) VARIABLE CAPACITY TURBOCHARGER

(71) Applicant: IHI Corporation, Tokyo (JP)

(72) Inventors: Naotoshi Shimizu, Tokyo (JP); Kengo Ikeda, Tokyo (JP); Takao Asakawa, Tokyo (JP); Hayato Shibayama, Tokyo (JP); Kenichi Segawa, Tokyo (JP); Ryosuke Miyao, Tokyo (JP); Takafumi Ueda, Tokyo (JP)

(*) Notice: Subject to any disclaimer, the term of this patent is extended or adjusted under 35 U.S.C. 154(b) by 0 days.

(21) Appl. No.: 18/475,229

(22) Filed: Sep. 27, 2023

(65) Prior Publication Data
US 2024/0018879 A1    Jan. 18, 2024

Related U.S. Application Data

(63) Continuation of application No. PCT/JP2022/012684, filed on Mar. 18, 2022.

(30) Foreign Application Priority Data

Apr. 20, 2021 (JP) .................................. 2021-071087

(51) Int. Cl.
*F01D 17/16* (2006.01)
*F01D 15/08* (2006.01)
*F01D 25/32* (2006.01)

(52) U.S. Cl.
CPC ............ *F01D 17/16* (2013.01); *F01D 15/08* (2013.01); *F01D 25/32* (2013.01); *F05D 2220/40* (2013.01); *F05D 2240/128* (2013.01)

(58) Field of Classification Search
CPC ........ F01D 15/08; F01D 17/16; F01D 17/165; F01D 25/24; F01D 25/32; F02B 37/24;
(Continued)

(56) References Cited

U.S. PATENT DOCUMENTS 9,062,636 B2 * 6/2015 Nishimori .............. F02M 26/58
9,879,687 B2 * 1/2018 Iizuka et al. .......... F01D 17/165
(Continued)

FOREIGN PATENT DOCUMENTS

EP       1674668       6/2006
JP    2005-331410     12/2005
(Continued)

OTHER PUBLICATIONS

International Search Report dated Apr. 19, 2022 for PCT/JP2022/012684.
(Continued)

*Primary Examiner* — Jesse S Bogue
(74) *Attorney, Agent, or Firm* — SOEI PATENT & LAW FIRM

(57) ABSTRACT

A variable capacity turbocharger includes a turbine impeller, a gas inlet passage fluidly coupled to the turbine impeller, a nozzle vane located in the gas inlet passage, a drive assembly that rotates the nozzle vane, a drive chamber accommodating the drive assembly and including a region configured to store liquid in the drive chamber, and a liquid passage fluidly coupled with the drive chamber and configured to discharge the liquid from the drive chamber. A surface of the liquid passage has a greater surface roughness than the region of the drive chamber.

20 Claims, 6 Drawing Sheets

(58) Field of Classification Search
CPC ............... F02B 39/00; F05D 2220/40; F05D 2240/128; Y02T 10/12
See application file for complete search history.

(56) References Cited

U.S. PATENT DOCUMENTS

| | | | | |
|---|---|---|---|---|
| 11,377,979 | B2* | 7/2022 | Ikeya | ............... F02B 39/16 |
| 11,692,461 | B2* | 7/2023 | Sakisaka | ............... F02B 47/08 |
| | | | | 60/605.2 |
| 2006/0216487 | A1 | 9/2006 | Fukui | |
| 2009/0092483 | A1* | 4/2009 | Yasui | ............... F01D 17/165 |
| | | | | 415/159 |
| 2014/0208740 | A1* | 7/2014 | Malone | ............... F02B 37/18 |
| | | | | 60/273 |
| 2020/0158131 | A1* | 5/2020 | Kessler | ............... F04C 23/006 |
| 2021/0061186 | A1 | 3/2021 | Nishiyama et al. | |

FOREIGN PATENT DOCUMENTS

| | | | |
|---|---|---|---|
| JP | 2006-177318 | | 7/2006 |
| JP | 2006-257249 | | 9/2006 |
| JP | 2009-074492 | | 4/2009 |
| JP | 2009-180110 | | 8/2009 |
| JP | 2009180111 A | * | 8/2009 |
| JP | 2009-228450 | | 10/2009 |
| JP | 2012-102660 | | 5/2012 |
| JP | 2012102660 A | * | 5/2012 |
| JP | 2015-063944 | | 4/2015 |
| JP | 2017-089241 | | 5/2017 |
| WO | 2021/002056 | | 1/2021 |

OTHER PUBLICATIONS

International Preliminary Report on Patentability with Written Opinion dated Nov. 2, 2023 for PCT/JP2022/012684.

* cited by examiner

Fig.5B HYDROPHILIC SURFACE

Fig.5C HYDROPHOBIC SURFACE

VARIABLE CAPACITY TURBOCHARGER

CROSS-REFERENCE TO RELATED APPLICATIONS

This application is a continuation application of PCT Application No. PCT/JP2022/012684, filed on Mar. 18, 2022, which claims the benefit of priority from Japanese Patent Application No. 2021-071087, filed on Apr. 20, 2021. The entire contents of the above listed PCT and priority applications are incorporated herein by reference.

BACKGROUND

Field

The present disclosure relates to a variable capacity turbocharger.

Description of the Related Art

Variable capacity turbochargers including a variable nozzle assembly are described in Japanese Unexamined Patent Publication No. 2006-177318, Japanese Unexamined Patent Publication No. 2009-74492, Japanese Unexamined Patent Publication No. 2009-228450, Japanese Unexamined Patent Publication No. 2012-102660, and Japanese Unexamined Patent Publication No. 2015-63944. The variable nozzle assembly includes nozzle vanes that adjust the flow of gas passing through a turbine impeller, and a drive assembly that drives the nozzle vanes. The nozzle vanes are rotatably attached to a nozzle ring via nozzle shafts, and the drive assembly drives the nozzle vanes by rotating the nozzle shafts. A housing of the variable capacity turbocharger is provided with a drive chamber accommodating the drive assembly. For example, in a case where the variable capacity turbocharger is used in a cold region, there is a possibility that when moisture in the gas inside the drive chamber stagnates and freezes, the movement of the drive assembly is hindered.

SUMMARY

Disclosed herein is an example variable capacity turbocharger including a turbine impeller, a housing accommodating the turbine impeller, and a variable nozzle assembly accommodated in the housing. The variable nozzle assembly includes a nozzle vane located on a passage of gas introduced into the turbine impeller, a nozzle ring rotatably supporting the nozzle vane, and a drive assembly that is located opposite to the nozzle vane with the nozzle ring interposed between the drive assembly and the nozzle vane, and that rotates the nozzle vane. The housing includes a drive chamber accommodating the drive assembly, and a liquid passage fluidly coupled with the drive chamber. The drive chamber includes an inner peripheral surface facing an outer peripheral portion of the drive assembly, and a surface roughness of a passage surface of the liquid passage is greater than a surface roughness of at least a region of the inner peripheral surface, the region being connected to the liquid passage.

In some examples, the variable capacity turbocharger includes the drive chamber accommodating the drive assembly, and the drive chamber includes the inner peripheral surface facing the outer peripheral portion of the drive assembly. Liquid such as water contained in the gas inside the drive chamber is likely to stagnate on the inner peripheral surface. The housing includes the liquid passage fluidly coupled with the drive chamber to discharge the liquid. By mounting the variable capacity turbocharger in a vehicle, etc. such that the region of the inner peripheral surface becomes a lower portion in a vertical direction, the region being connected to the liquid passage, the liquid generated inside the drive chamber can be discharged from the liquid passage. In some examples, the surface roughness of the passage surface of the liquid passage is greater than the surface roughness of the region of the inner peripheral surface, the region being connected to the liquid passage. The housing of the variable capacity turbocharger may be made of metal, and a surface of the housing, at least the inner peripheral surface of the drive chamber and the passage surface of the liquid passage form substantially hydrophilic surfaces. In the case of a hydrophilic surface, the greater the surface roughness is, the smaller the contact angle of a water droplet becomes, and the more readily the water droplet passes through narrow gaps. Accordingly, even when the liquid stagnates on the inner peripheral surface, the liquid is readily drained to a liquid passage side with a large surface roughness.

In some examples, at least a part of the passage surface of the liquid passage may continue flush with the inner peripheral surface. When portions that continue flush with each other without a step between the passage surface of the liquid passage and the inner peripheral surface are provided, an incident where the liquid remains due to the step is less likely to occur.

In some examples, the housing may include a scroll passage formed around the turbine impeller. The liquid passage may be formed to allow communication between the scroll passage and the drive chamber. Since the liquid discharged to the scroll passage quickly evaporates and disappears due to the driving of the turbine impeller.

In some examples, the housing may include an inner wall portion provided between the drive chamber and the scroll passage, and overlapping an outer peripheral portion of the nozzle ring. The outer peripheral portion of the nozzle ring may be provided with a balance hole that reduces a pressure difference between the drive chamber and the scroll passage. The liquid passage may be provided in the inner wall portion such that at least a part of the liquid passage overlaps the balance hole. When at least the part of the liquid passage is provided to overlap the balance hole, widening a region where the liquid passage fluidly couples with the drive chamber while avoiding the nozzle ring.

In some examples, the liquid passage may include at least a first flow path portion and a second flow path portion that are located at locations in a circumferential direction along a rotation direction of the turbine impeller. A phase angle between the first flow path portion and the second flow path portion may be between 8° and 23°. For example, even when a vehicle, etc. in which the variable capacity turbocharger is mounted is stopped on a slope with a gradient, the liquid stagnating inside the drive chamber is readily discharged from one of the flow path portions.

In some examples, the passage surface of the liquid passage and the inner peripheral surface may be hydrophilic surfaces.

In some examples, the balance holes may be provided at a plurality of location in a circumferential direction of the nozzle ring, and the balance holes may be provided at equal intervals in the circumferential direction of the nozzle ring.

In some examples, a passage cross-section of the liquid passage may be provided such that an entire width of the passage cross-section of the liquid passage in a circumferential direction of the nozzle ring fits within a passage cross-section of the balance hole.

Another example variable capacity turbocharger includes a turbine impeller, a gas inlet passage fluidly coupled to the turbine impeller, a nozzle vane located in the gas inlet passage, a drive assembly that rotates the nozzle vane, a drive chamber accommodating the drive assembly and comprising a region configured to store liquid in the drive chamber, and a liquid passage fluidly coupled with the drive chamber and configured to discharge the liquid from the drive chamber. A surface of the liquid passage has a greater surface roughness than the region of the drive chamber.

Another example variable capacity turbocharger includes a turbine impeller, a gas inlet passage fluidly coupled to the turbine impeller, a nozzle vane located in the gas inlet passage, a drive assembly configured to rotate the nozzle vane, a drive chamber accommodating the drive assembly and comprising a region configured to store liquid in the drive chamber, and a drain passage fluidly coupled with the drive chamber to drain the liquid, and extending in a rotary axis direction of the turbine impeller.

BRIEF DESCRIPTION OF THE DRAWINGS

FIG. 5B is a view schematically illustrating the contact angle of a water droplet and the shape of the water droplet on a hydrophilic surface.

FIG. 5C is another view schematically illustrating the contact angle of a water droplet and the shape of the water droplet on a hydrophobic surface.

DETAILED DESCRIPTION

In the following description, with reference to the drawings, the same reference numbers are assigned to the same components or to similar components having the same function, and overlapping description is omitted.

Figure 1:
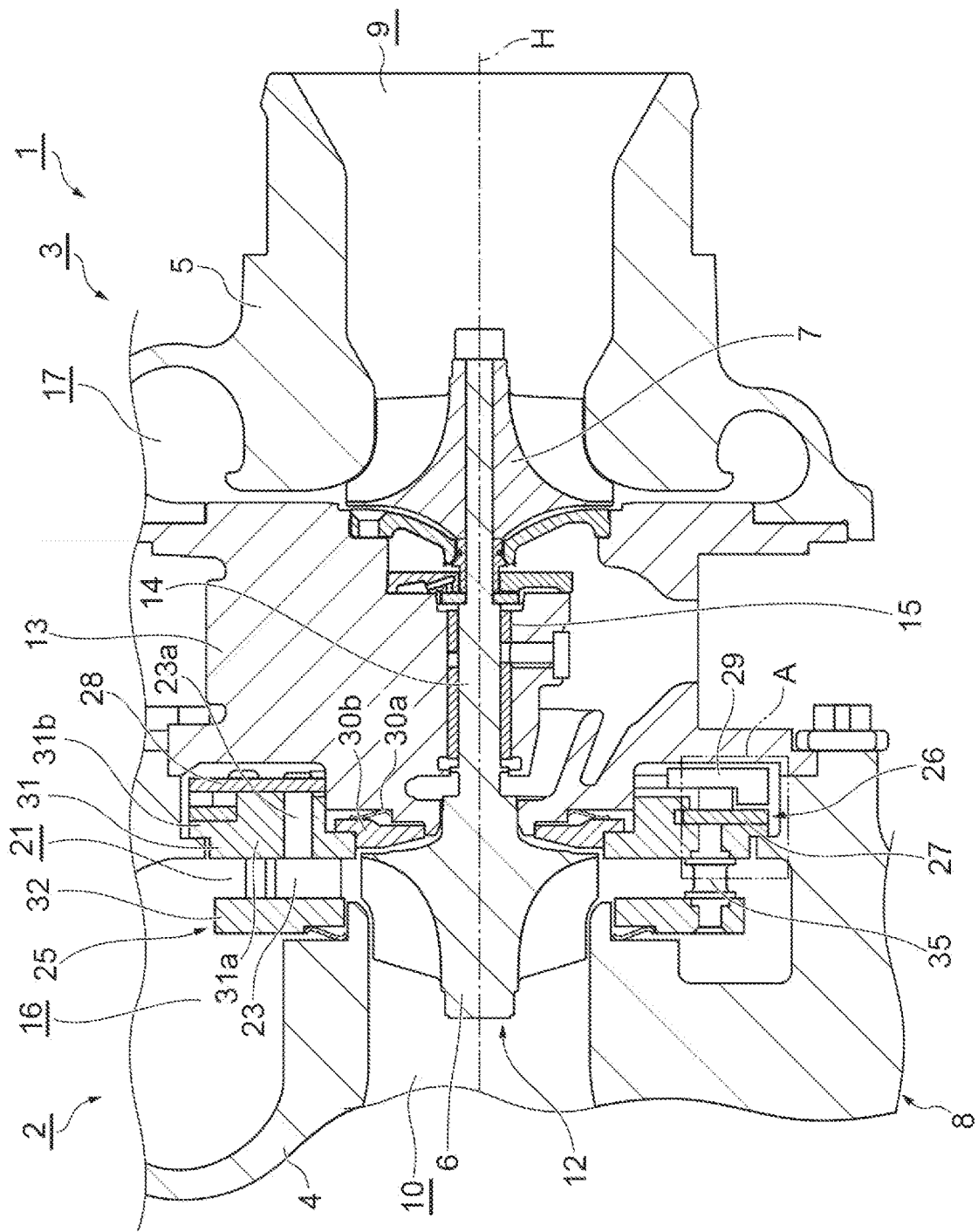
FIG. 1 is a cross-sectional view illustrating an example variable capacity turbocharger

An example variable capacity turbocharger 1 (refer to FIG. 1) is applied to, for example, internal combustion engines for ships or vehicles. As shown in FIG. 1, the variable capacity turbocharger 1 (e.g., variable-geometry turbocharger) includes a turbine 2 and a compressor 3. The turbine 2 includes a turbine housing 4 and a turbine impeller 6 accommodated in the turbine housing 4. The turbine housing 4 has a scroll passage 16 extending in a circumferential direction around the turbine impeller 6 (rotation direction of the turbine impeller 6). The compressor 3 includes a compressor housing 5 and a compressor impeller 7 accommodated in the compressor housing 5. The compressor housing 5 has a scroll passage 17 extending in a circumferential direction around the compressor impeller 7 (rotation direction of the compressor impeller 7).

The turbine impeller 6 is provided at one end of a rotary shaft 14, and the compressor impeller 7 is provided at the other end of the rotary shaft 14. A bearing housing 13 is provided between the turbine housing 4 and the compressor housing 5. The rotary shaft 14 is rotatably supported via a bearing 15 by the bearing housing 13, and the rotary shaft 14, the turbine impeller 6, and the compressor impeller 7 rotate around a rotary axis H as an integral rotatable body 12. A housing 8 of the variable capacity turbocharger 1 includes the turbine housing 4, the bearing housing 13, and the compressor housing 5.

The turbine housing 4 is provided with an exhaust gas inlet port and an exhaust gas outlet port 10. Exhaust gas discharged from an internal combustion engine flows into the turbine housing 4 through the exhaust gas inlet port, flows into the turbine impeller 6 through the scroll passage 16, and rotates the turbine impeller 6. Thereafter, the exhaust gas flows to the outside of the turbine housing 4 through the exhaust gas outlet port 10.

The compressor housing 5 is provided with an intake port 9 and a discharge port. When the turbine impeller 6 rotates as described above, the compressor impeller 7 rotates via the rotary shaft 14. The rotating compressor impeller 7 suctions outside air through the intake port 9, compresses the suctioned air, and discharges the compressed air from the discharge port through the scroll passage 17. The compressed air discharged from the discharge port is supplied to the internal combustion engine described above.

The turbine 2 is a variable capacity turbine, and includes a gas inlet passage 21 connecting the scroll passage 16 and the turbine impeller 6. The gas inlet passage 21 is a passage of the exhaust gas introduced into the turbine impeller 6. A plurality of movable nozzle vanes 23 are disposed on the gas inlet passage 21. The plurality of nozzle vanes 23 are disposed on a circumference with the rotary axis H as the center, and each of the nozzle vanes 23 rotates around an axis parallel to the rotary axis H. By the rotation of the nozzle vanes 23, the cross-sectional area of the gas passage is optimally adjusted according to the flow rate of the exhaust gas introduced into the turbine 2. The turbine 2 includes a variable nozzle assembly 25 as a drive mechanism for rotating the nozzle vanes 23.

The variable nozzle assembly 25 is accommodated in the housing 8. The variable nozzle assembly 25 is fitted into the inside of the turbine housing 4 in a state where the variable nozzle assembly 25 is adjacent to the turbine impeller 6, and is sandwiched and fixed between the turbine housing 4 and the bearing housing 13.

The variable nozzle assembly 25 includes the plurality of nozzle vanes 23 described above and a first nozzle ring 31 and a second nozzle ring 32 interposing the nozzle vanes 23 therebetween in a rotary axis H direction. Each of the first nozzle ring 31 and the second nozzle ring 32 has a ring shape with the rotary axis H as the center, and is disposed to surround the turbine impeller 6 in the circumferential direction (rotation direction of the turbine impeller 6). The first nozzle ring 31 and the second nozzle ring 32 are disposed to face each other with a predetermined gap kept by a connecting pin 35. A region formed between the first nozzle ring 31 and the second nozzle ring 32 serves as the gas inlet passage 21. The second nozzle ring 32 faces the scroll passage 16 (refer to FIG. 1), and the second nozzle ring 32 forms a part of an inner wall of the scroll passage 16. A rotary shaft 23a of each of the nozzle vanes 23 penetrates through the first nozzle ring 31, and the first nozzle ring 31 supports each of the nozzle vanes 23 in a cantilever manner. The nozzle vanes 23 are illustrated as being disposed on a circumference at equal intervals, but may be disposed at unequal intervals. The first nozzle ring 31 is one example of a nozzle ring that rotatably supports the nozzle vanes 23.

The variable nozzle assembly 25 includes a drive assembly 26 that rotates the nozzle vanes 23. The drive assembly 26 is disposed opposite to the nozzle vanes 23 with the first nozzle ring 31 interposed therebetween. The drive assembly 26 includes a drive ring 27, nozzle link plates 28, and a drive link plate 29. The drive ring 27 is a member that transmits a force, which is input from the outside, to the nozzle vanes 23 as a driving force to rotate the nozzle vanes 23. The drive ring 27 has a ring shape extending on a circumference with the rotary axis H as the center. The drive ring 27 is attached to a support member fixed to the housing 8, and is supported by the support member so as to be rotatable around the rotary axis H.

The nozzle link plates 28 are attached to the rotary shafts 23a of the respective nozzle vanes 23. The nozzle link plates 28 are disposed at equal intervals on a circumference inside the drive ring 27. The drive link plate 29 is disposed so as to be aligned with the nozzle link plates 28. The drive link plate 29 tilts (rotates) by receiving a driving force from the outside, and the drive ring 27 is rotated by the tilting. The nozzle link plates 28 rotate while following the rotation of the drive ring 27, and rotate the nozzle vanes 23 via the respective rotary shafts 23a. The drive link plate 29 and the drive ring 27 cooperate to rotate the nozzle link plates 28, and the nozzle link plates 28 are rotated by the rotation.

Figure 2:
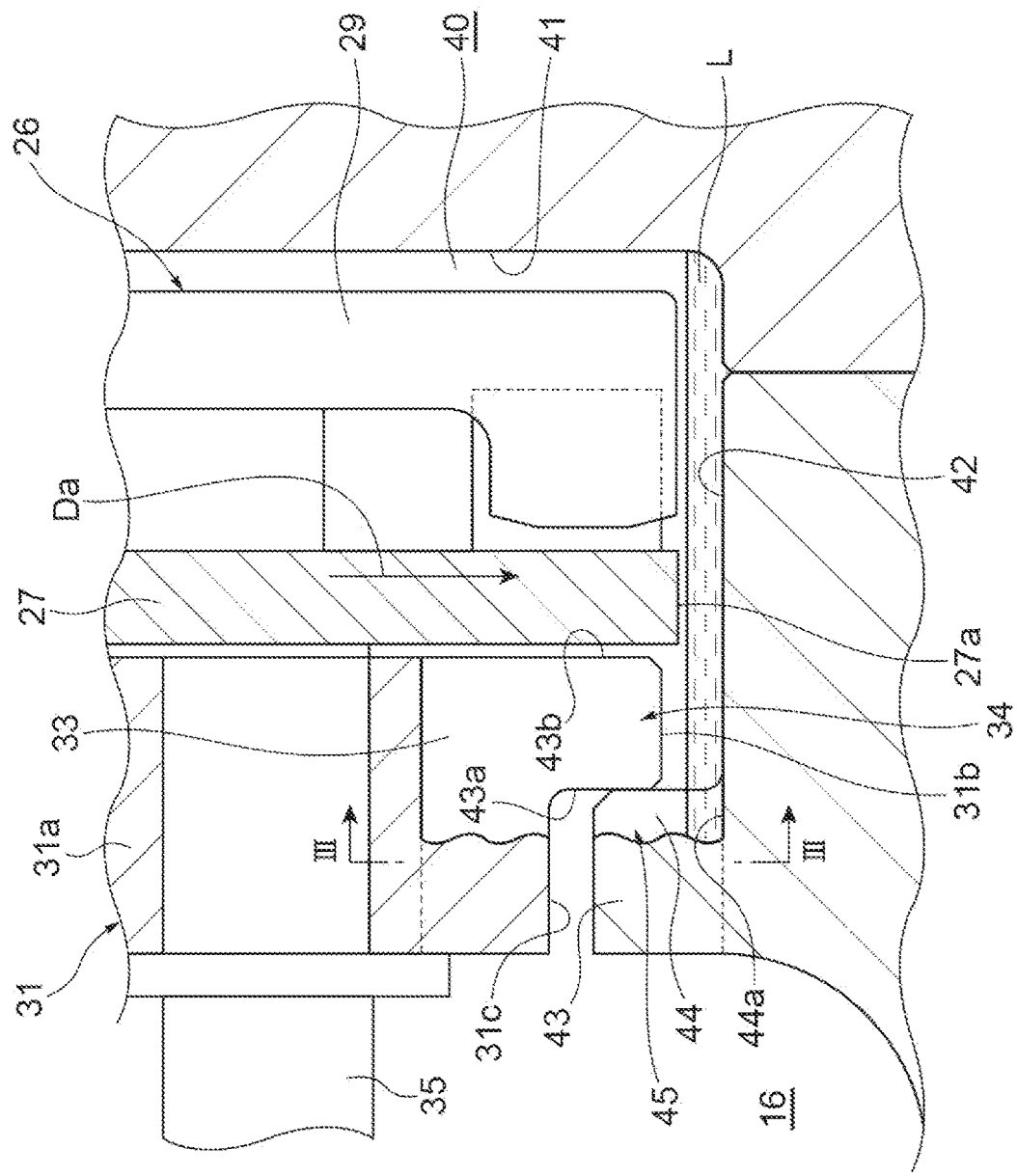
FIG. 2 is an enlarged view of a region indicated by reference sign A in FIG. 1.

As shown in FIG. 2, the housing 8 includes a drive chamber 40 accommodating the drive assembly 26. The drive chamber 40 is provided at the location of connection between the turbine housing 4 and the bearing housing 13, and has a wall inner surface 41 surrounding the drive assembly 26. The drive assembly 26 includes an outer peripheral portion 27a. The outer peripheral portion 27a is a portion of the drive assembly 26, which is located outside the rotating turbine impeller 6 in a centrifugal direction (radial direction) Da. For example, an outer peripheral end surface of the drive ring 27 forms at least a part of the outer peripheral portion 27a. A region of the wall inner surface 41, which faces the outer peripheral portion 27a of the drive assembly 26, is an inner peripheral surface 42. For example, the inner peripheral surface 42 is a surface of a region where liquid L such as water may stagnate when generated inside the drive chamber 40 in a state where the variable capacity turbocharger 1 is installed such that the rotary axis H of the turbine impeller 6 is horizontal. The inner peripheral surface 42 is an example of a region where the liquid L is stored in the drive chamber 40.

The housing 8 includes an inner wall portion 43 provided between the drive chamber 40 and the scroll passage 16. The inner wall portion 43 partitions the drive chamber 40 from the scroll passage 16 in cooperation with the first nozzle ring 31. For example, the inner wall portion 43 is provided inside the turbine housing 4, and is erected to protrude inward (in a direction opposite to the centrifugal direction Da) from the inner peripheral surface 42 of the drive chamber 40. In some examples, the inner wall portion 43 is a wall provided in an annular shape along the entire circumference of an outer peripheral portion 31b of the first nozzle ring 31.

Here, a relationship between the outer peripheral portion 31b of the first nozzle ring 31 and the inner wall portion 43 will be described. The first nozzle ring 31 includes a main body portion 31a that rotatably supports the nozzle vanes 23 (refer to FIG. 1), and the outer peripheral portion 31b having a thin wall and extending outward (in the centrifugal direction Da) in a flange shape from the main body portion 31a. A step portion 31c is formed between the main body portion 31a and the outer peripheral portion 31b. It should be noted that for example, the step portion 31c may not be provided, and the main body portion 31a and the outer peripheral portion 31b may substantially continue with each other with the same plate thickness.

The outer peripheral portion 31b of the first nozzle ring 31 includes a first side surface 43a on a scroll passage 16 side and a second side surface 43b on a drive chamber 40 side. The inner wall portion 43 overlaps the first side surface 43a. At least a part of the inner wall portion 43 is disposed to fit within a gap formed by the step portion 31c.

Figure 3:
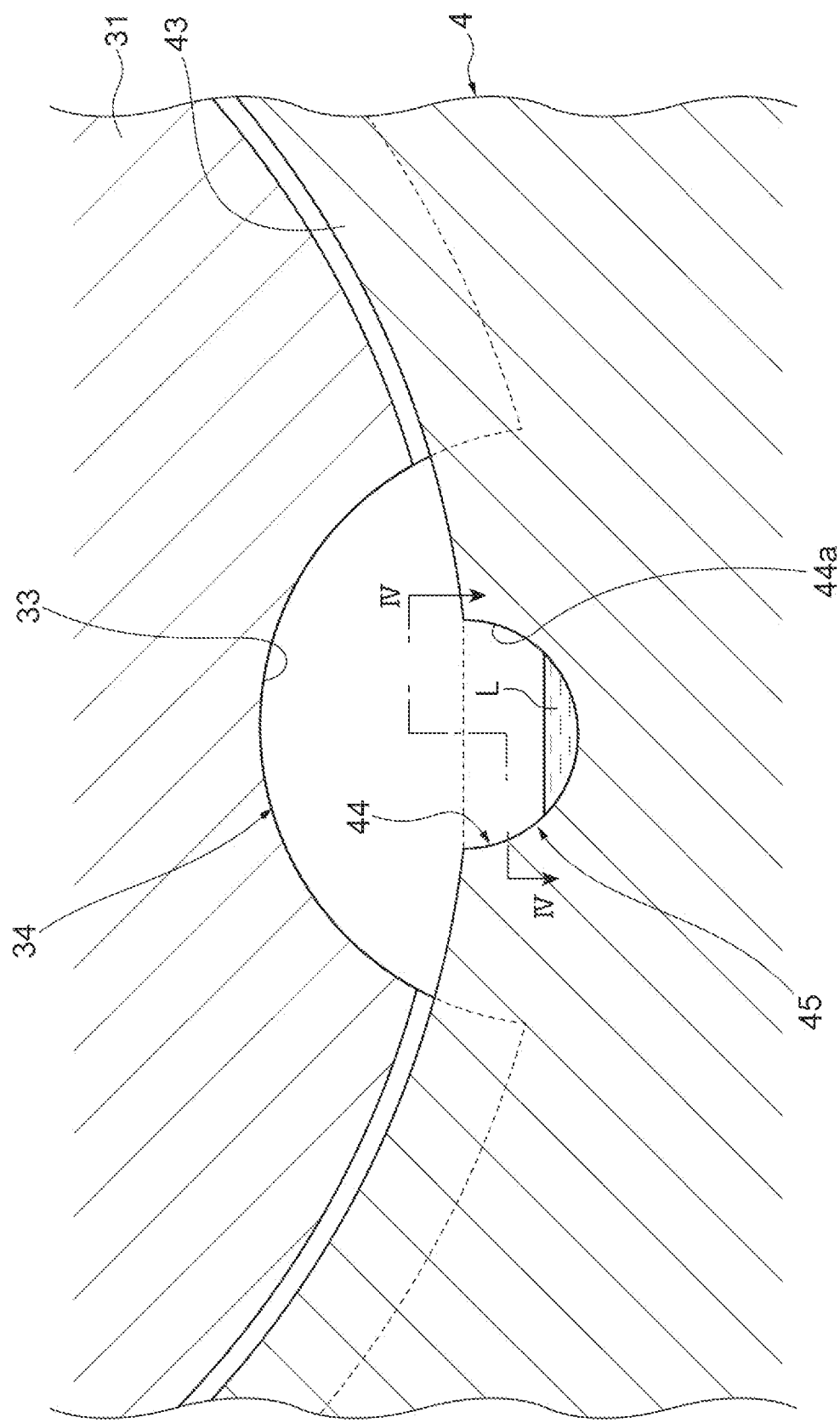
FIG. 3 is a cross-sectional view taken along line III-III in FIG. 2.
Figure 4:
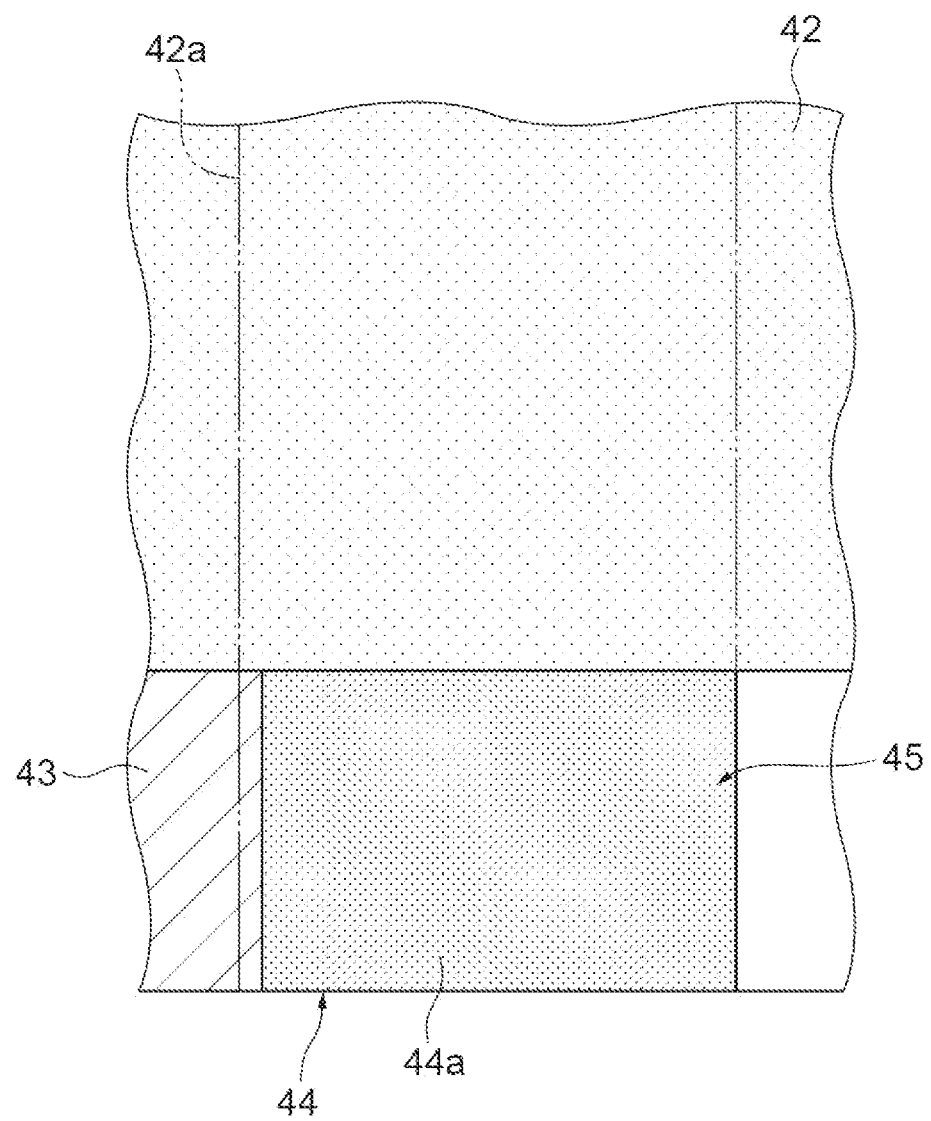
FIG. 4 is a cross-section taken along line Iv-Iv in FIG. 3.

As shown in FIGS. 2, 3, and 4, the inner wall portion 43 is provided with a liquid passage 45. The liquid passage includes a flow path portion 44 or a plurality of flow path portion 44. The flow path portion (e.g., drain passage) fluidly couples between the drive chamber 40 and the scroll passage 16. The flow path portion 44 has the function of discharging the liquid L such as water contained in the gas when the liquid L stagnates inside the drive chamber 40. The flow path portion 44 can be provided, for example, to extend in the rotary axis H direction. By providing the flow path portion 44 so as to extend in the rotary axis H direction, the manufacturing becomes easier. In addition, the flow path portion 44 can be provided, for example, to extend in a direction that is obliquely inclined with respect to the rotary axis H direction. By providing the flow path portion 44 so as to be inclined with respect to the rotary axis H direction, the discharge performance is improved. For example, the flow path portion 44 may be inclined such that the other end portion of the flow path portion 44 close to the scroll passage 16 is lower than one end portion thereof close to the drive chamber 40.

In some examples, the flow path portion 44 is a groove, and a passage cross-section has a shape in which a part of an outer edge is open, for example, a semicircular shape or U shape. For example, the flow path portion 44 is a through-hole, and a passage cross-section can have a shape in which the entirety of an outer edge is closed, and may have a circular shape, elliptical shape, or any other shapes.

In some examples, a part of a passage surface 44a of the flow path portion 44 continues flush with the inner peripheral surface 42 of the drive chamber 40. By providing the passage surface 44a that continues flush with the inner peripheral surface 42 of the drive chamber 40, the liquid L stagnating on the inner peripheral surface 42 is easily discharged through the flow path portion 44. The passage surface 44a of the flow path portion 44 may be structured, for example, not to include a portion that continues flush with the inner peripheral surface 42. In some examples, a step is generated between the passage surface 44a of the flow path portion 44 and the inner peripheral surface 42; however, when the liquid level of the liquid L (height from a lowest surface to the liquid level of the liquid L) stagnating on the inner peripheral surface 42 increases and exceeds at least the step, the liquid L can be discharged through the flow path portion 44.

A surface roughness of the passage surface 44a of the flow path portion 44 is greater than a surface roughness of at least a region 42a of the inner peripheral surface 42, the region 42a being connected to the flow path portion 44 (refer to FIG. 4). It should be noted that in FIG. 4, the surface roughness is represented by dots and denser dots indicate a greater surface roughness. In addition, the region 42a of the inner peripheral surface 42 means a region where an extension region of the flow path portion 44 overlaps the inner peripheral surface 42, the region 42a being connected to the flow path portion 44 and the extension region extending to an inner peripheral surface 42 side. By setting the surface roughness of the passage surface 44a of the flow path portion 44 to be greater than the surface roughness of the inner peripheral surface 42, the discharge performance of the liquid L stagnating on the inner peripheral surface 42 can be improved. The discharge function will be described in more detail.

Figure 5A:
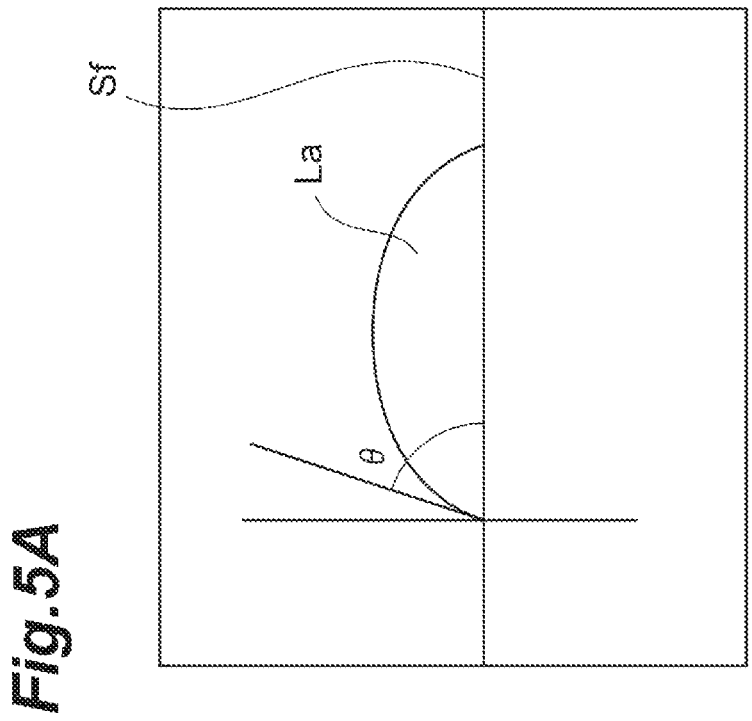
FIG. 5A is a view schematically illustrating the contact angle of a water droplet and the shape of the water droplet on a flat surface.
Figure 5A:
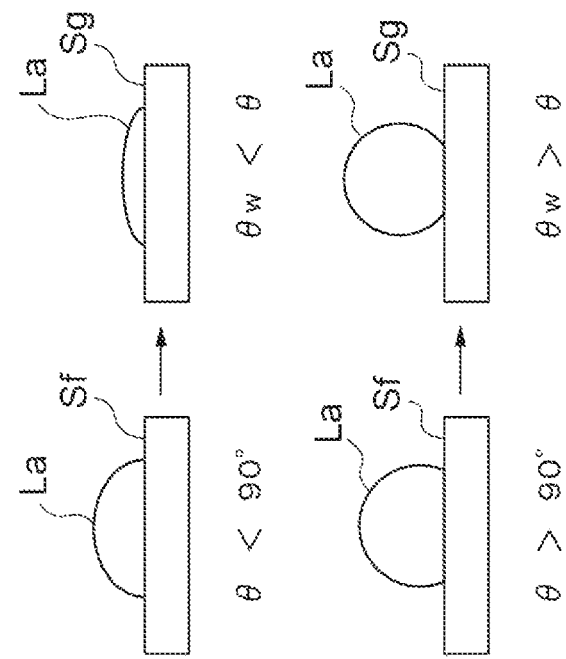

FIG. 5 is a view showing a relationship between properties of a surface in contact with a water droplet La and a contact angle, and FIG. 5(a) is a view for describing the contact angle of the water droplet La on a flat surface (smooth surface) Sf. In addition, FIG. 5(b) is a view schematically showing a relationship between the contact angle and the shape of the water droplet La when a surface is a hydrophilic surface, and FIG. 5(c) is a view schematically showing a relationship between the contact angle and the shape of the water droplet La when a surface is a hydrophobic surface. In FIG. 5, θ indicates a contact angle on the flat surface Sf, and θw indicates a contact angle on a rough surface Sg having a greater surface roughness than the flat surface Sf. The contact angle θw of the rough surface Sg can be obtained by the following Wenzel equation (1).

$$\cos \theta w = r \cos \theta \quad (1)$$

Here, r indicates a ratio of an actual surface area to an apparent surface area, "r=1" means the flat surface Sf, and "r>1" means that the surface roughness is greater than that of the flat surface Sf.

As shown in FIG. 5, in the case of a hydrophilic surface, the contact angle θ on the flat surface Sf is smaller than 90°, and the greater the surface roughness becomes with respect to the flat surface Sf, the smaller the contact angle θw becomes. On the other hand, in the case of a hydrophobic surface, the contact angle θ on the flat surface Sf is larger than 90°, and the greater the surface roughness becomes with respect to the flat surface Sf, the larger the contact angle θw becomes. Here, the smaller the contact angle θw is, the more easily the water droplet La enters narrow gaps, and the more the discharge performance is improved.

The example variable capacity turbocharger 1 may comprise one or more of the following features. First, the housing 8 of the variable capacity turbocharger 1 is basically made of metal, and a surface of the housing 8 forms a hydrophilic surface. The greater the surface roughness becomes, the smaller the contact angle becomes, and the more easily the water droplet La enters narrow gaps. In the case of the variable capacity turbocharger 1, the surface roughness of the passage surface 44a of the flow path portion 44 is greater than the surface roughness of the region 42a of the inner peripheral surface 42, the region 42a being connected to the flow path portion 44. As a result, for example, the liquid L stagnating on the inner peripheral surface 42 is suctioned to move into the passage surface 44a of the flow path portion 44, and is discharged to the scroll passage 16 through the flow path portion 44.

An example method for manufacturing the variable capacity turbocharger 1, including a method for forming the flow path portion 44 in the turbine housing 4, will be described. The turbine housing 4 can be made of, for example, ductile cast iron, Ni-Resist cast iron, a cast steel-based material, etc. depending on the exhaust gas temperature, and can be manufactured by applying a precision casting method such as a shell mold method or a cold box method. The flow path portion 44 is formed, for example, by applying cutting (drilling), etc. to the turbine housing 4 manufactured by the foregoing method. During the cutting, the surface roughness of the passage surface 44a of the flow path portion 44 is adjusted to be greater than a surface roughness of the wall inner surface 41 of the drive chamber 40 of the turbine housing 4, particularly the surface roughness of the inner peripheral surface 42. In addition, after cutting is performed on the flow path portion 44, post-processing can also be performed to relatively increase the surface roughness of the passage surface 44a of the flow path portion 44.

In addition, the entirety of the turbine housing 4 including the flow path portion 44 can also be manufactured by a general casting method, etc. In this case, the surface roughness of the turbine housing 4 becomes greater compared to the precision casting method. Therefore, machining or polishing can also be performed on the inner peripheral surface 42 while leaving the passage surface 44a of the flow path portion 44 in the state of a casting surface. Machining or polishing can also be performed such that the surface roughness of the passage surface 44a of the flow path portion 44 is greater than the surface roughness of the inner peripheral surface 42.

An opening 34 formed in the first nozzle ring 31 will be described with reference to FIGS. 2 and 3. The first nozzle ring 31 is located between the scroll passage 16 and the drive chamber 40. The opening 34 includes a balance hole 33 or a plurality of balance hole 33. The balance hole 33 is a groove or a through-hole fluidly coupled between the drive chamber 40 and the scroll passage 16. The balance hole 33 has the function of reducing a pressure difference generated between the drive chamber 40 and the scroll passage 16. The function will be described in more detail.

The first nozzle ring 31 (refer to FIG. 1) is pressed against the bearing housing 13 via a disk spring 30a, a heat shield plate 30b, etc., and is held at a predetermined position. In this state, when the pressure inside the scroll passage 16 becomes larger than the pressure inside the drive chamber 40 and the state is maintained, the contact load of the disk spring 30a supporting the first nozzle ring 31 becomes larger than expected. The fluid performance may be better when the nozzle vanes 23 are disposed closer to the second nozzle ring 32 than to the first nozzle ring 31. By providing the balance hole 33, the pressure difference generated between the drive chamber 40 and the scroll passage 16 may be reduced, and may be keep the positions of the first nozzle ring 31 and the second nozzle ring 32. As a result, both suppressing the occurrence of creep and suppressing performance degradation can be achieved.

The balance holes 33 are, for example, provided at a plurality of locations that are at equal intervals (the same phases) in the circumferential direction of the first nozzle ring 31. The balance holes 33 may be provided at three locations with a phase of 120°. It should be noted that one balance hole 33 may be provided or the balance holes 33 may be provided at a plurality of locations that are at unequal intervals in the circumferential direction.

At least a part of the flow path portion 44 provided in the inner wall portion 43 is disposed to overlap the balance hole 33 when viewed in the rotary axis H direction (refer to FIG. 3). For example, the passage cross-section of the flow path portion 44 has a semicircular shape in which the arc is located on a lower side, and the balance hole 33 has a semicircular shape in which the arc is located on an upper side. In some examples, the flow path portion 44 overlaps the balance hole 33 such that substantially the entirety of the passage cross-section of the flow path portion 44 fits within the passage cross-section of the balance hole 33 except for a portion of a lower portion. The flow path portion 44 overlaps the balance hole 33 such that the entire width of the passage cross-section of the flow path portion 44 in the circumferential direction of the first nozzle ring 31 fits within the passage cross-section of the balance hole 33. It should be noted that the meaning that at least a part of the flow path portion 44 overlaps the balance hole 33 may be described as a state where the phases of the flow path portion 44 and the balance hole 33 overlap each other when viewed with respect to the rotation direction of the turbine impeller 6. For example, an area of the cross-section of the balance hole 33 is larger than an area of the passage cross-section of the flow path portion 44. In some examples, the area of the cross-section of the balance hole 33 and the area of the passage cross-section of the flow path portion 44 may be the same or the area of the passage cross-section of the flow path portion 44 may be larger than the area of the cross-section of the balance hole 33. In some example, the cross-sectional width of the flow path portion in a circumferential direction of the first nozzle ring 31 is smaller than a diameter of the balance hole 33 in a circumferential direction of the first nozzle ring 31.

Figure 6B:
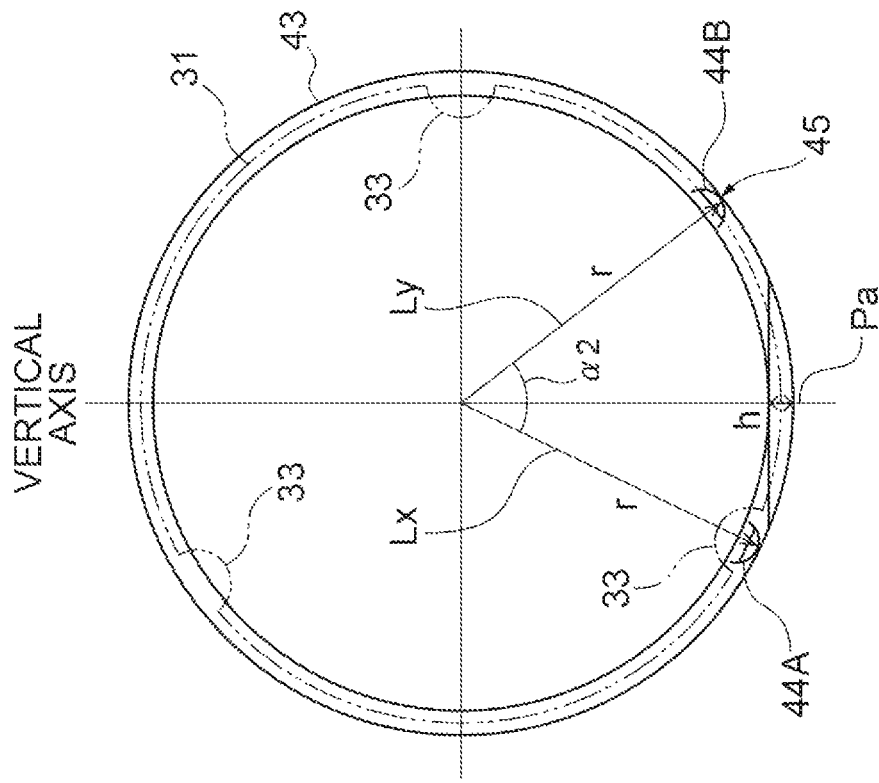
FIG. 6B schematically shows a comparative relationship between the inclination of a vehicle, etc. in which an example variable capacity turbocharger is mounted and the positions of drain passages.
Figure 6A:
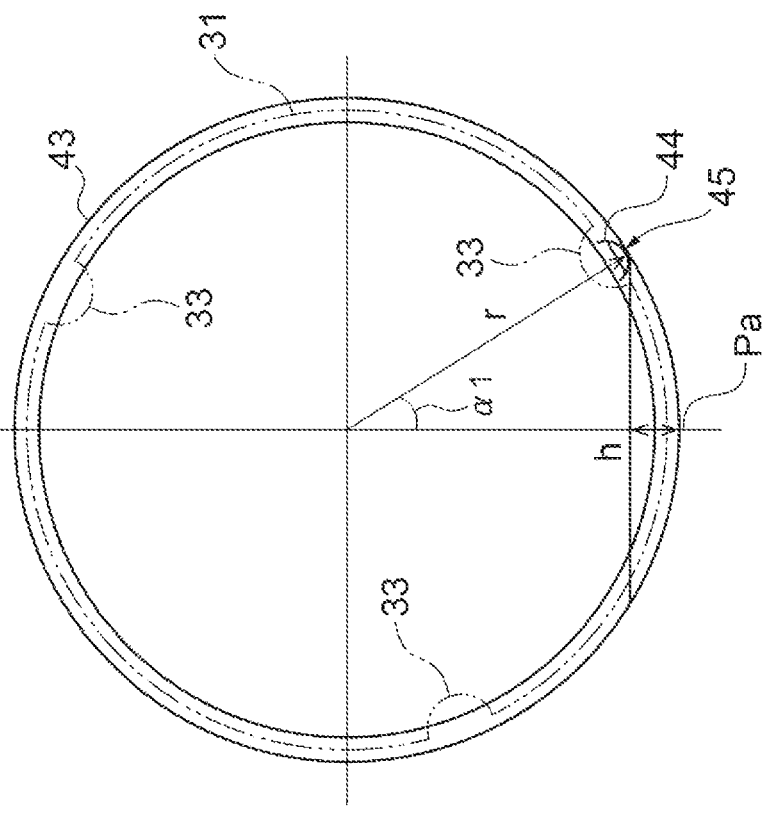
FIG. 6A schematically shows a relationship between the inclination of a vehicle, etc. in which an example variable capacity turbocharger is mounted and the positions of drain passages.

The disposition of the flow path portion 44 around the rotary axis H of the turbine impeller 6 will be described with reference to FIG. 6. FIG. 6A shows an example of the disposition of the flow path portion 44. FIG. 6B shows an example of the disposition of flow path portions 44A and 44B.

One flow path portion 44 of the variable capacity turbocharger 1 may be provided. When a vehicle, etc. in which the variable capacity turbocharger 1 is mounted is inclined and stopped, as shown in FIG. 6A, the flow path portion 44 is located at a position offset from a vertical axis. In this case, a misalignment of the flow path portion 44 with respect to a lower end point Pa on the vertical axis can be represented by, for example, a rotation angle (phase angle) α1 around the rotary axis H The liquid L stagnating inside the drive chamber 40 is discharged from the flow path portion 44 when a liquid level (draft height) h of the liquid L from the lower end point Pa reaches the flow path portion 44. Here, when the distance from the rotary axis H to the flow path portion 44 is defined as r, the liquid level h at which the liquid L is discharged from the flow path portion 44 is expressed by the following equation (2).

$$h = r - r \cos \alpha 1 \quad (2)$$

The example flow path portions 44A and 44B will be described in further detail. The flow path portions 44A and 44B are provided at a plurality of locations along the circumferential direction of the inner wall portion 43. For example, the flow path portions 44A and 44B are provided at two locations. A vehicle, etc. in which the variable capacity turbocharger 1 is mounted is not limited to being always stopped in a place without a gradient, and there is a possibility that the vehicle, etc. is stopped on a slope with a minimum gradient of approximately 15°. In this mode, by providing the flow path portions 44A and 44B, one of the flow path portions 44A and 44B is brought closer to the lower end point Pa of the vertical axis. As a result, the stagnant liquid L may be discharged at a position where the liquid level h is at its lowest point.

In some examples, a relative positional relationship between flow path portions 44A and 44B may be represented by a rotation angle (phase angle) α2 around the rotary axis H. A first straight line Lx formed by the rotary axis H and one flow path portion 44A and a second straight line Ly formed by the rotary axis H and the other flow path portion 44B are assumed. An angle formed the first straight line Lx and the second straight line Ly intersecting each other at the rotary axis H is the rotation angle α2 around the rotary axis H. The rotation angle α2 may be set to between 8° and 23°. In addition, as described above, in the mode of operation in which a vehicle is stopped on a slope with a gradient of approximately 15°, it may be set that the rotation angle α2 is between 14° and 17°.

Next, example modes of operations of the variable capacity turbocharger 1 will be described. The variable capacity turbocharger 1 includes the drive chamber 40 accommodating the drive assembly 26, and the drive chamber 40 includes the inner peripheral surface 42 facing the outer peripheral portion 27a of the drive assembly 26. The liquid L such as water contained in the gas inside the drive chamber 40 is likely to stagnate on the inner peripheral surface 42. The inner wall portion 43 of the housing 8 is provided with the flow path portion 44 fluidly coupled with the drive chamber 40 to discharge the liquid L. By mounting the variable capacity turbocharger 1 in a vehicle, etc. such that the region 42a of the inner peripheral surface 42 becomes a lower portion in a vertical direction, the region 42a being connected to the flow path portion 44, the liquid L generated inside the drive chamber 40 may be discharged from the flow path portion 44.

Further, the surface roughness of the passage surface 44a of the flow path portion 44 is greater than the surface roughness of the region 42a of the inner peripheral surface 42, the region 42a being connected to the flow path portion 44. The housing 8 is made of metal, and the inner peripheral surface 42 and the passage surface 44a of the flow path portion 44 form substantially hydrophilic surfaces. In the mode of a hydrophilic surface, the greater the surface roughness is, the smaller the contact angle of a water droplet becomes, and the more easily the water droplet passes through narrow gaps. Even when the liquid L stagnates on the inner peripheral surface 42, the liquid L is suctioned and readily drained to a flow path portion 44 side with a large surface roughness, and the discharge performance of the liquid L can be improved.

By improving the discharge performance of the liquid L stagnating inside the drive chamber 40, even when the liquid L has stagnated, the liquid level of the liquid L may be lowered. Accordingly, for example, even when a vehicle, etc. in which the variable capacity turbocharger 1 is mounted is stopped in a cold region and the liquid L inside the drive chamber 40 freezes, the freezing may not hinder the driving of the drive assembly 26, such as during startup of the drive assembly 26.

In some examples, at least a part of the passage surface 44a of the flow path portion 44 continues flush with the inner peripheral surface 42. Portions that continue flush with each other without a step between the passage surface 44a of the flow path portion 44 and the inner peripheral surface 42 are provided, and the liquid L is readily drained through the portions. Accordingly, an incident where the liquid L remains due to the step is less likely to occur, and the discharge performance of the liquid L may be improved.

In addition, the flow path portion 44 is formed to allow communication between the scroll passage 16 and the drive chamber 40, and the liquid L that has passed through the flow path portion 44 is discharged to the scroll passage 16. The liquid L discharged to the scroll passage 16 quickly evaporates and disappears due to the driving of the turbine impeller 6. As a result, the discharge performance of the liquid L may be improved.

The variable capacity turbocharger 1 may include the balance holes 33 provided in the first nozzle ring 31. At least a part of the flow path portion 44 is provided to overlap the balance hole 33. Accordingly, by widening a region where the flow path portion 44 fluidly couples with the drive chamber 40 while avoiding the first nozzle ring 31, the discharge performance of the liquid L may be improved.

In some examples, the balance holes 33 have the function of reducing the pressure difference between the drive chamber 40 and the scroll passage 16. The dimensions of the balance holes 33 may be selected to control the pressure difference. When the flow path portion 44 is provided to allow communication between the scroll passage 16 and the drive chamber 40, the formation of the balance holes 33 may be configured in consideration of the influence of the flow path portion 44. An example variable capacity turbocharger 1 includes the flow path portion 44, which has at least a part overlapping the balance hole 33. Accordingly, compared to a structure in which the flow path portion is formed independently from the balance holes 33, the influence of the flow path portion 44 may become smaller.

An example variable capacity turbocharger includes the two flow path portions 44A and 44B, and the rotation angle (phase angle) α2 between the one flow path portion 44A and the other flow path portion 44B is between 8° and 23°. Accordingly, for example, even when a vehicle, etc. in which the variable capacity turbocharger 1 is mounted is stopped on a slope with a gradient, the liquid L such as water stagnating inside the drive chamber 40 may be discharged readily from one of the flow path portions 44.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:
1. A variable capacity turbocharger comprising:
  a turbine impeller;
  a housing accommodating the turbine impeller; and
  a variable nozzle assembly accommodated in the housing,
  wherein the variable nozzle assembly includes a nozzle vane, a drive assembly configured to rotate the nozzle vane, and a nozzle ring rotatably supporting the nozzle vane and interposed between the drive assembly and the nozzle vane,
  wherein the housing includes a drive chamber accommodating the drive assembly, and a liquid passage fluidly coupled with the drive chamber,
  wherein the drive chamber includes an inner peripheral surface facing an outer peripheral portion of the drive assembly, and
  wherein a surface roughness of a passage surface of the liquid passage is greater than a surface roughness of a region of the inner peripheral surface connected to the liquid passage.

2. The variable capacity turbocharger according to claim 1, wherein at least a part of the passage surface of the liquid passage continues flush with the inner peripheral surface.

3. The variable capacity turbocharger according to claim 1,
  wherein the housing further includes a scroll passage located around the turbine impeller, and
  wherein the liquid passage fluidly couples the scroll passage and the drive chamber.

4. The variable capacity turbocharger according to claim 3,
  wherein the housing includes an inner wall portion located between the drive chamber and the scroll passage,
  wherein the nozzle ring comprises an outer peripheral portion overlapping the inner wall portion, and
  wherein the outer peripheral portion of the nozzle ring comprises a balance hole that reduces a pressure difference between the drive chamber and the scroll passage.

5. The variable capacity turbocharger according to claim 4, wherein the inner wall portion forms part of the liquid passage.

6. The variable capacity turbocharger according to claim 4, wherein at least a portion of the liquid passage overlaps the balance hole.

7. The variable capacity turbocharger according to claim 4, wherein a plurality of balance hole are located at locations in a circumferential direction of the nozzle ring.

8. The variable capacity turbocharger according to claim 7, wherein the plurality of balance hole are located at equal intervals in the circumferential direction of the nozzle ring.

9. The variable capacity turbocharger according to claim 4, wherein a cross-sectional width of the liquid passage in a circumferential direction of the nozzle ring is smaller than a diameter of the balance hole.

10. The variable capacity turbocharger according to claim 1,
  wherein the liquid passage comprises a first flow path portion and a second flow path portion that are located in a circumferential direction along a rotation direction of the turbine impeller, and
  wherein a phase angle between the first flow path portion and the second flow path portion is between 8° and 23°.

11. The variable capacity turbocharger according to claim 1, wherein the passage surface of the liquid passage is a hydrophilic surface.

12. A variable capacity turbocharger comprising:
  a turbine impeller;
  a gas inlet passage fluidly coupled to the turbine impeller;
  a nozzle vane located in the gas inlet passage;
  a drive assembly that rotates the nozzle vane;
  a drive chamber accommodating the drive assembly and comprising a region configured to store liquid in the drive chamber; and
  a liquid passage fluidly coupled with the drive chamber and configured to discharge the liquid from the drive chamber,
  wherein a surface of the liquid passage has a greater surface roughness than the region of the drive chamber.

13. The variable capacity turbocharger according to claim 12, wherein at least a part of the surface of the liquid passage continues flush with the region of the drive chamber.

14. The variable capacity turbocharger according to claim 12, wherein the liquid passage includes a flow path portion extending in a rotation axis direction of the turbine impeller.

15. The variable capacity turbocharger according to claim 12,
  wherein the liquid passage includes flow path portions that are located in a circumferential direction of the turbine impeller, and
  wherein the flow path portions extend in a rotation axis direction of the turbine impeller.

16. The variable capacity turbocharger according to claim 12, further comprising:

a scroll passage located around the turbine impeller; and a nozzle ring that rotatably supports the nozzle vane and is located between the scroll passage and the drive chamber, wherein the nozzle ring includes an opening fluidly coupling the scroll passage with the drive chamber and configured to reduce a pressure difference between the scroll passage and the drive chamber.

17. The variable capacity turbocharger according to claim 16, wherein the opening includes balance holes that are located in a circumferential direction of the turbine impeller.

18. The variable capacity turbocharger according to claim 12, wherein the surface of the liquid passage and the region of the drive assembly are hydrophilic surfaces.

19. A variable capacity turbocharger comprising:

a turbine impeller;

a gas inlet passage fluidly coupled to the turbine impeller;

a nozzle vane located in the gas inlet passage;

a drive assembly configured to rotate the nozzle vane;

a drive chamber accommodating the drive assembly and comprising a region configured to store liquid in the drive chamber; and a drain passage fluidly coupled with the drive chamber to drain the liquid, and extending in a rotary axis direction of the turbine impeller, wherein a surface of the drain passage has a greater surface roughness than the region of the drive chamber.

20. The variable capacity turbocharger according to claim 19, wherein the surface of the drain passage and the region of the drive chamber are hydrophilic surfaces.

* * * * *